United States Patent
Chou et al.

(10) Patent No.: US 9,608,457 B2
(45) Date of Patent: Mar. 28, 2017

(54) CHARGING DEVICE AND METHOD FOR COMMONLY CHARGING MULTIPLE DIGITAL ELECTRONIC DEVICES

(71) Applicant: Aver Information Inc., New Taipei (TW)

(72) Inventors: Lien-Kai Chou, New Taipei (TW); Chao-Hung Chang, New Taipei (TW); Chi-Fa Hsu, New Taipei (TW)

(73) Assignee: Aver Information Inc., New Taipei (TW)

( * ) Notice: Subject to any disclaimer, the term of this patent is extended or adjusted under 35 U.S.C. 154(b) by 178 days.

(21) Appl. No.: 14/571,366

(22) Filed: Dec. 16, 2014

(65) Prior Publication Data

US 2015/0349580 A1    Dec. 3, 2015

(30) Foreign Application Priority Data

May 29, 2014    (TW) .............................. 103118768 A

(51) Int. Cl.
*H02J 7/00*    (2006.01)
*H02J 7/04*    (2006.01)

(52) U.S. Cl.
CPC .......... *H02J 7/0013* (2013.01); *H02J 7/0026* (2013.01); *H02J 7/044* (2013.01); *H02J 7/0044* (2013.01); *H02J 7/0047* (2013.01)

(58) Field of Classification Search
CPC ................................................... H02J 7/0013
USPC ........................................................ 320/111
See application file for complete search history.

(56) References Cited

U.S. PATENT DOCUMENTS

| 8,935,011 B2 | 1/2015 | Tischer |
| 9,397,515 B2 | 7/2016 | Tischer |
| 2007/0252435 A1* | 11/2007 | Coe ...................... H02J 7/1423 307/10.1 |
| 2012/0032766 A1 | 2/2012 | Liang |

FOREIGN PATENT DOCUMENTS

| CN | 2497465 Y | 6/2002 |
| TW | M424624 U | 3/2012 |

\* cited by examiner

*Primary Examiner* — Thuan Do
(74) *Attorney, Agent, or Firm* — Alan D. Kamrath; Kamrath IP Lawfirm, P.A.

(57) ABSTRACT

A charging device for commonly charging multiple digital electronic devices has a housing, a charge control unit and multiple outlet strips. The charge control unit is mounted inside the housing and has multiple relays. The outlet strips are electrically connected to the charge control unit with each outlet strip electrically connected to one of the relays. A charging method corresponding to the charging device is performed by the charge control unit without the need of users' configuration during a charge cycle. The charge method automatically determines if the outlet strips can simultaneously supply power to charge during each charge schedule of the charge cycle. At least one outlet strip supplies power to charge during each charge schedule, and each outlet strip supplies power to charge once, thereby achieving optimization for the charging process with automatic determination and enhancing charging efficiency and users' operational convenience.

18 Claims, 8 Drawing Sheets

CHARGING DEVICE AND METHOD FOR COMMONLY CHARGING MULTIPLE DIGITAL ELECTRONIC DEVICES

BACKGROUND OF THE INVENTION

1. Field of the Invention

The present invention relates to a charging device and method for commonly charging multiple digital electronic devices and, more particularly, to a charging device for commonly charging multiple digital electronic devices using an intelligent charging method that optimizes a number of charge cycles.

2. Description of the Related Art

In pursuit of a paperless environment and an augmented learning interest, many educational institutions have incorporated various electronic devices, such as media players, smart phones, notebook computers, tablet personal computers and the like, into the teaching environment. When operated in a teaching environment, those digital electronic devices rely on their own battery to supply power needed by the digital electronic devices. To simultaneously accommodate and charge multiple digital electronic devices, a charging device is required to do the job. However, when multiple digital electronic devices are simultaneously charged, the demanded current may overload an electricity distribution system supplying power for charging the digital electronic devices and may affect other electricity consuming appliances in the charging environment. To tackle the foregoing issue, multiple charging zones are divided, such that only a digital electronic device connected to one outlet strip can be charged in one charge cycle. Alternatively, an electricity distribution system connected to multiple outlet strips can be manually configured to simultaneously charge multiple digital electronic devices connected to the outlet strips only when the electricity distribution system is not overloaded.

As only the electronic digital devices connected to one outlet strip can be charged during a charge cycle, multiple charge cycles are required to charge all the digital electronic devices connected to all the outlet strips. When the electricity distribution system is not overloaded and is manually configured to simultaneously charge multiple digital electronic devices connected to the multiple outlet strips, such manual setting adds operation burden to users to configure the electricity distribution system to charge the digital electronic devices connected to each outlet strip once in each cycle, failing to be an optimized charging approach.

SUMMARY OF THE INVENTION

An objective of the present invention is to provide a charging device and a method for commonly charging multiple digital electronic devices allowing multiple outlet strips of the charging device to simultaneously supply power for charging during a charge cycle without requiring additional users' configuration for the purpose of optimization of the charging process and enhancement of charging efficiency and operational convenience.

To achieve the foregoing objective, the charging device for commonly charging multiple digital electronic devices has a housing, a charge control unit and multiple outlet strips.

The charge control unit is mounted inside the housing and has multiple relays.

The outlet strips are electrically connected to the charge control unit with each outlet strip electrically connected to one of the relays.

The charge control unit activates all the relays, records a current value of each outlet strip, configures a total outlet current threshold, and generates multiple charge schedules of a charge cycle with multiple combinations of the multiple outlet strips, performing charging in each charge schedule of the charge cycle. Each combination of the multiple charge schedules includes at least one of the outlet strips to perform charging during each charge schedule and total current values of the at least one outlet strip do not exceed the total outlet current threshold. All the multiple outlet strips perform charging in the multiple charge schedules, and the charge control unit sequentially reads the combination of the multiple outlet strips in each charge schedule of the charge cycle to activate the relay corresponding to the at least one outlet strip in the combination for the at least one outlet strip to perform charging during the charge schedule.

Preferably, the charge control unit further configures a saturated charge current value less than the irregular current value, selects one of the outlet strips whose current value has not been acquired yet, activates the relay corresponding to the selected outlet strip and reads the current value of the selected outlet strip, determines if the current value of the selected outlet strip is located between the irregular current value and the saturated charge current value, and further selects another outlet strip whose current value has not been acquired yet until all the current values of the outlet strips are acquired.

To achieve the foregoing objective, the method for charging multiple digital electronic devices is performed by a charging device having a charge control unit and multiple outlet strips with each outlet strip electrically connected to the charge control unit through a relay. The charge control unit activates or deactivates the relays to connect or disconnect power to the outlet strips. The method has a test procedure, a configuration procedure and a charge procedure.

The test procedure activates all the relays to acquire and record a current value of each outlet strip.

The configuration procedure sets up a total outlet current threshold, and arranges multiple combinations of the multiple outlet strips for multiple charge schedules in a charge cycle according to the current values recorded in the test procedure. Each combination of the multiple outlet strips includes at least two of the multiple outlet strips for each charge schedule in the charge cycle, a total current value of the at least two outlets in each combination does not exceed the total outlet current threshold, and the combinations of the multiple outlet strips in the charge cycle include all the outlet strips.

The charge procedure sequentially activates the relays corresponding to the at least two of the multiple outlet strips for each charge schedule in the charge cycle to perform charging.

Preferably, the step of setting up the irregular current value further has a step of setting up a saturated charge current value.

The step of determining if the current value is higher than the irregular current value further has steps of determining if the current value is lower than the saturated charge current value, recording the current value and performing the step of determining if the relays corresponding to all the outlet strips have been activated when the current value is lower than the saturated charge current value.

The step of determining if the relays corresponding to all the outlet strips have been activated further has steps of deactivating all the relays when the current values of all the outlet strips have been acquired and are lower than the saturated charge current value to stop charging, and performing the configuration procedure when the current values of all the outlet strips have been acquired and the current value of any one of the outlet strips is not lower than the saturated charge current value.

The present invention employs a test procedure, a configuration procedure and a charge procedure to perform automatic determination and charging of the combinations of the outlet strips in each charge schedule of a charge cycle.

In the test procedure, the outlet strip having current values read therefrom lower than an irregular current value and a saturated charge current value are chosen as the candidate of a primary outlet strip. In the configuration procedure, each primary outlet strip is combined with the remaining outlet strips, which are taken as the secondary outlet strips, to generate a combination of the primary outlet strip and other outlet strip(s) with a total current thereof lower than a total outlet current threshold in a corresponding charge schedule of the charge cycle until all the primary outlets chosen have been combined similarly with the secondary outlet strips to form multiple combinations of the outlet strips for each charge schedule in the charge cycle. The charge procedure basically reads the combination of the outlet strips in each charge schedule of the charge cycle to charge digital electronic devices connected to the outlet strips in combination until the time of the charge cycle expires.

Given the foregoing features, the present invention can simultaneously supply power for charging multiple digital electronic devices during a charge cycle without additional users' configuration, thereby achieving optimization of charging process and enhancing charging efficiency and operational convenience during charging.

Other objectives, advantages and novel features of the invention will become more apparent from the following detailed description when taken in conjunction with the accompanying drawings.

DETAILED DESCRIPTION OF THE INVENTION

Figure 1A:
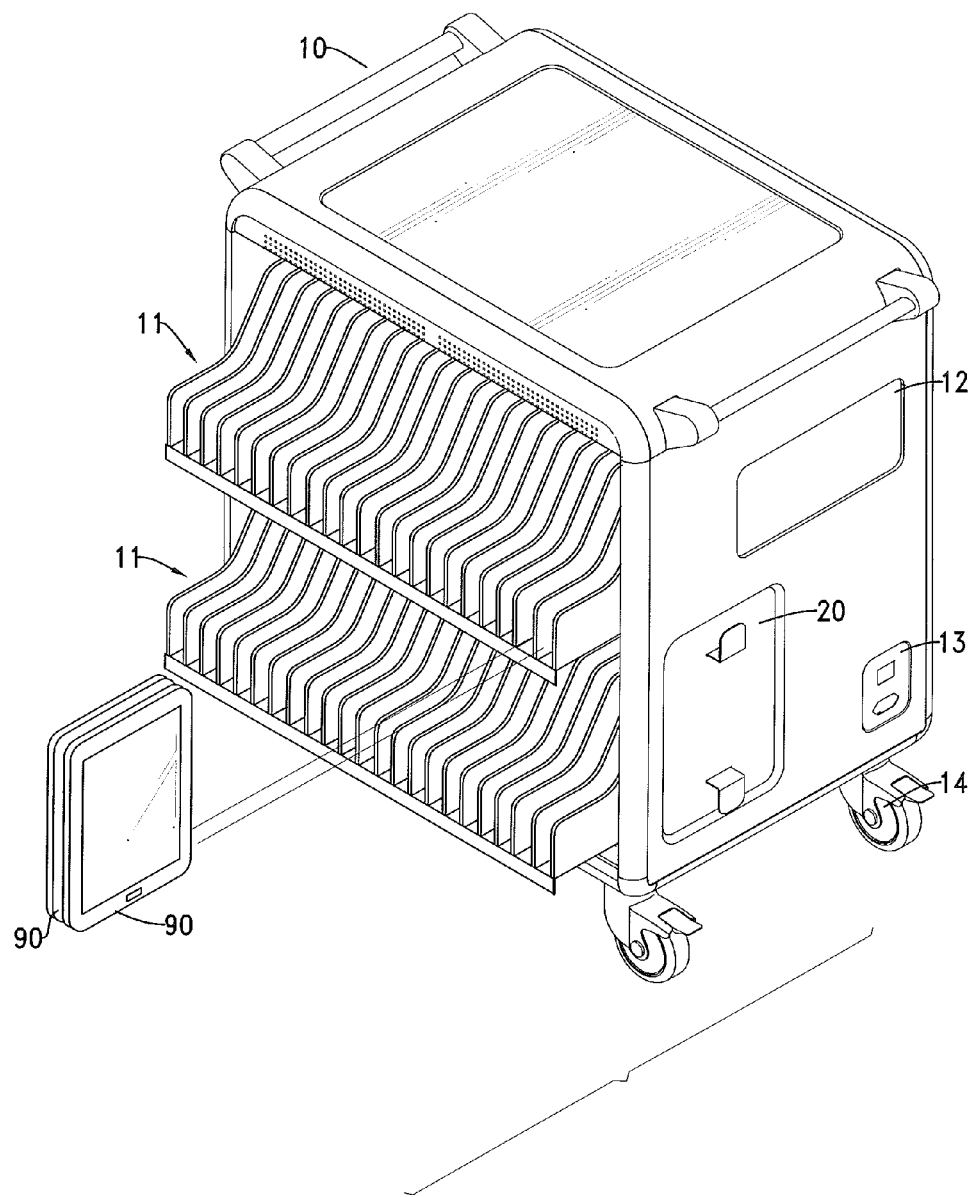
FIGS. 1A and 1B are perspective views of a first embodiment of a charging device for commonly charging multiple digital electronic devices in accordance with the present invention.
Figure 1B:
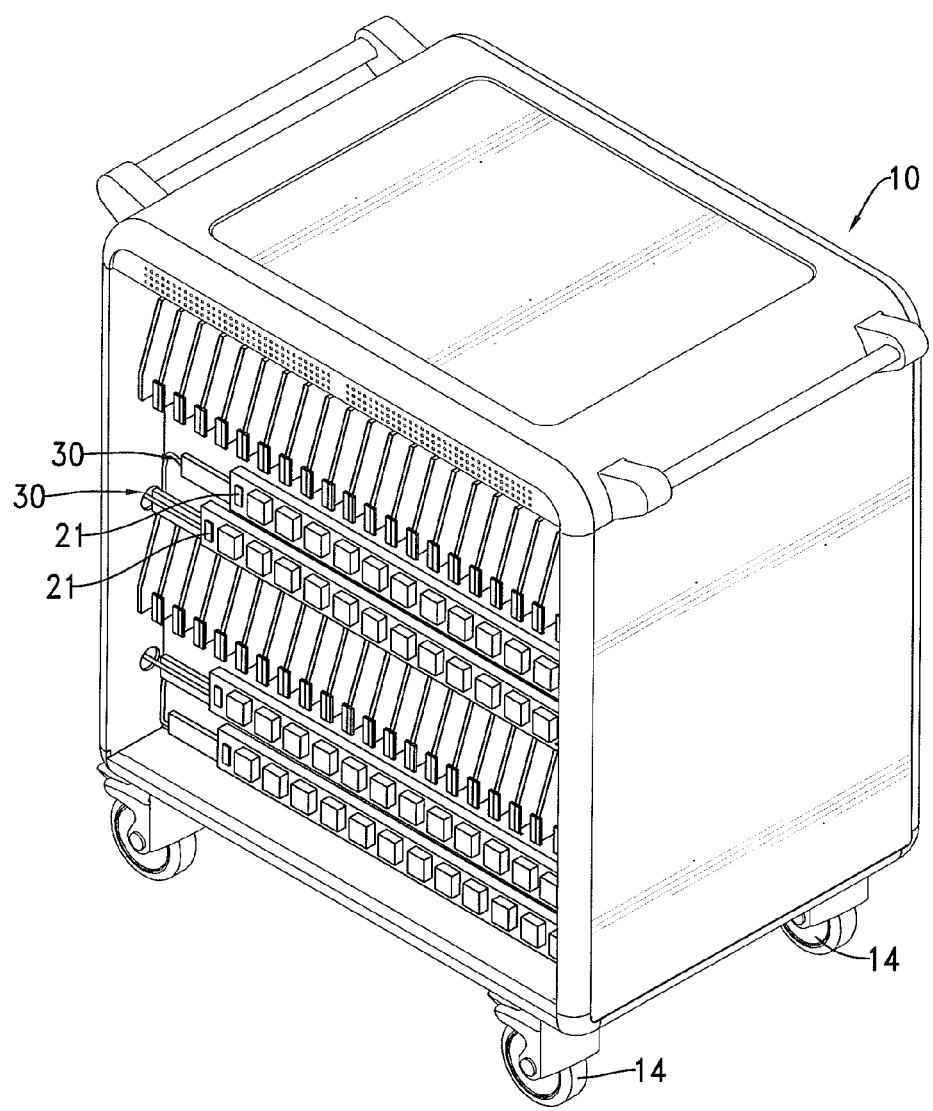

With reference to FIGS. 1A and 1B, a first embodiment of a charging device for commonly charging multiple digital electronic devices in accordance with the present invention is a charge cart and has a housing 10, a charge control unit 20 and four outlet strips 30.

The housing 10 has two shelves 11, a display interface 12, a power supply 13 and four trolleys 14. The shelves 11 are mounted inside the housing 10 in a top-down direction. The display interface 12 is mounted on a side surface of the housing 10. The power supply 13 is mounted inside the housing 10 and is located at a side portion of the housing 10. The trolleys 14 are mounted on four corners of a bottom of the housing 10.

The charge control unit 20 is mounted inside the housing 10, is electrically connected to the display interface 12 and the power supply 13, and has multiple relays 21. In the present embodiment, the charge control unit 20 has four relays 21. The four outlet strips 30 are mounted on a common side of the two shelves 11. Two of the outlet strips 30 are mounted on each shelf 11. Each outlet strip 30 is electrically connected to one of the relays 21, and serves to electrically connect to multiple digital electronic devices 90.

Figure 2A:
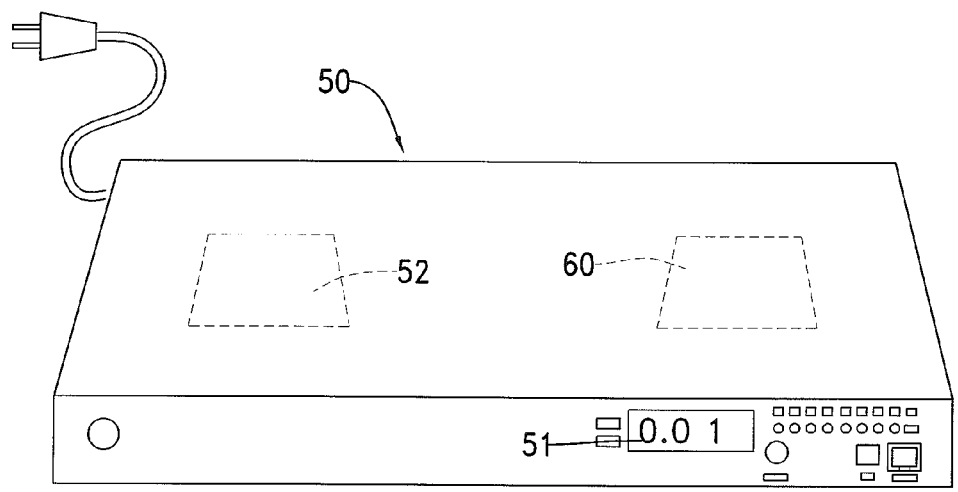
FIGS. 2A and 2B are perspective views of a second embodiment of a charging device for commonly charging multiple digital electronic devices in accordance with the present invention.
Figure 2B:
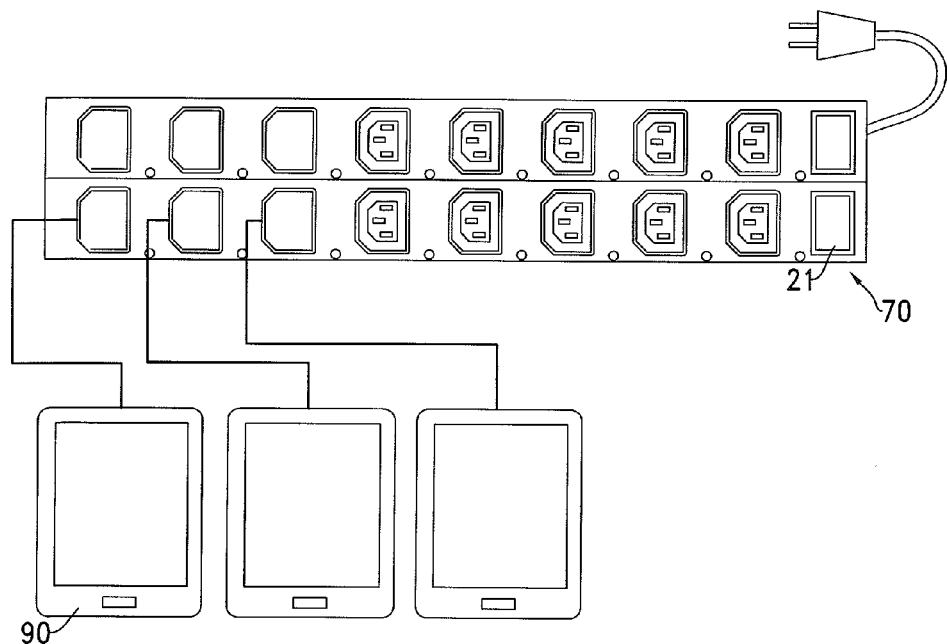

With reference to FIGS. 2A and 2B, a second embodiment of a charging device for commonly charging multiple digital electronic devices in accordance with the present invention is a portable charging device and has a housing 50, a charge control unit 60 and multiple outlet strips 70.

The housing 50 has a display interface 51 and a power supply 52. The display interface 51 is mounted on a side surface of the housing 50. The power supply 52 is mounted inside the housing 50 and is located at side portion of the housing 50.

The charge control unit 60 is mounted inside the housing 50, is electrically connected to the display interface 51 and the power supply, and has multiple relays 21. The outlet strips 70 are mounted on another side surface of the housing 50, and each outlet strip is electrically connected to one of the relays 21 and multiple digital electronic devices 90. Each relay 21 is electrically connected to the charge control unit 60 and a corresponding outlet strip 70.

When the charging device for commonly charging multiple digital electronic devices is operated, each outlet strip is electrically connected to multiple digital electronic devices. The charge control unit 60 automatically determines and configures an optimized charging schedule to control charging from start to finish.

Given the charge control unit for automatically determining a required charging process, the charging device requires no manual setting from users and thus achieves the goal of enhancing operational convenience.

A method for commonly charging multiple digital electronic devices in accordance with the present invention is performed by the charge control unit 60 of the foregoing charge control unit and includes a test procedure, a configuration procedure and a charge procedure.

Figure 3:
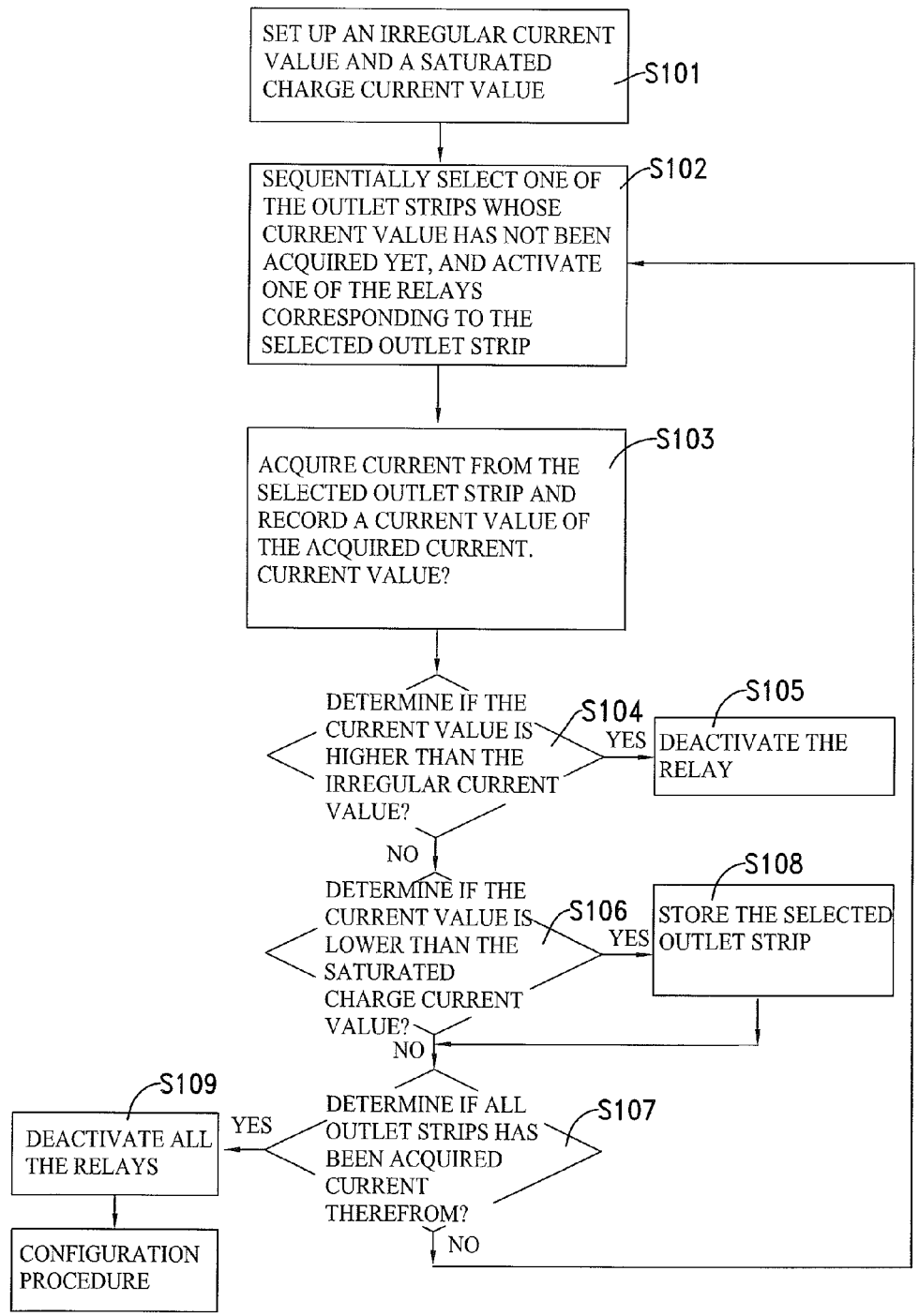
FIG. 3 is a flow diagram of a test procedure of a charging method for commonly charging multiple digital electronic devices in accordance with the present invention.

With reference to FIG. 3, the test procedure has the following steps.

Step S101: Set up an irregular current value and a saturated charge current value. The saturated charge current value is less than the irregular current value.

Step S102: Sequentially select one of the outlet strips whose current value has not been acquired yet, and activate one of the relays corresponding to the selected outlet strip.

Step S103: Acquire current from the selected outlet strip and record a current value of the acquired current.

Step S104: Determine if the current value is higher than the irregular current value. If positive, perform step S105 and resume step S102.

Step S105: Deactivate the relay as the selected outlet strip has an abnormal current value.

Step S106: Determine if the current value is lower than the saturated charge current value. If positive, perform step S108 as it represents that the selected outlet strip is normal but has not fully finished charging.

Step S107: Determine if all outlet strips has been acquired current therefrom. If positive, perform step S109 and the configuration procedure.

Step S108: Store the selected outlet strip for configuration and perform step S107.

Step S109: Deactivate all the relays.

Figure 4A:
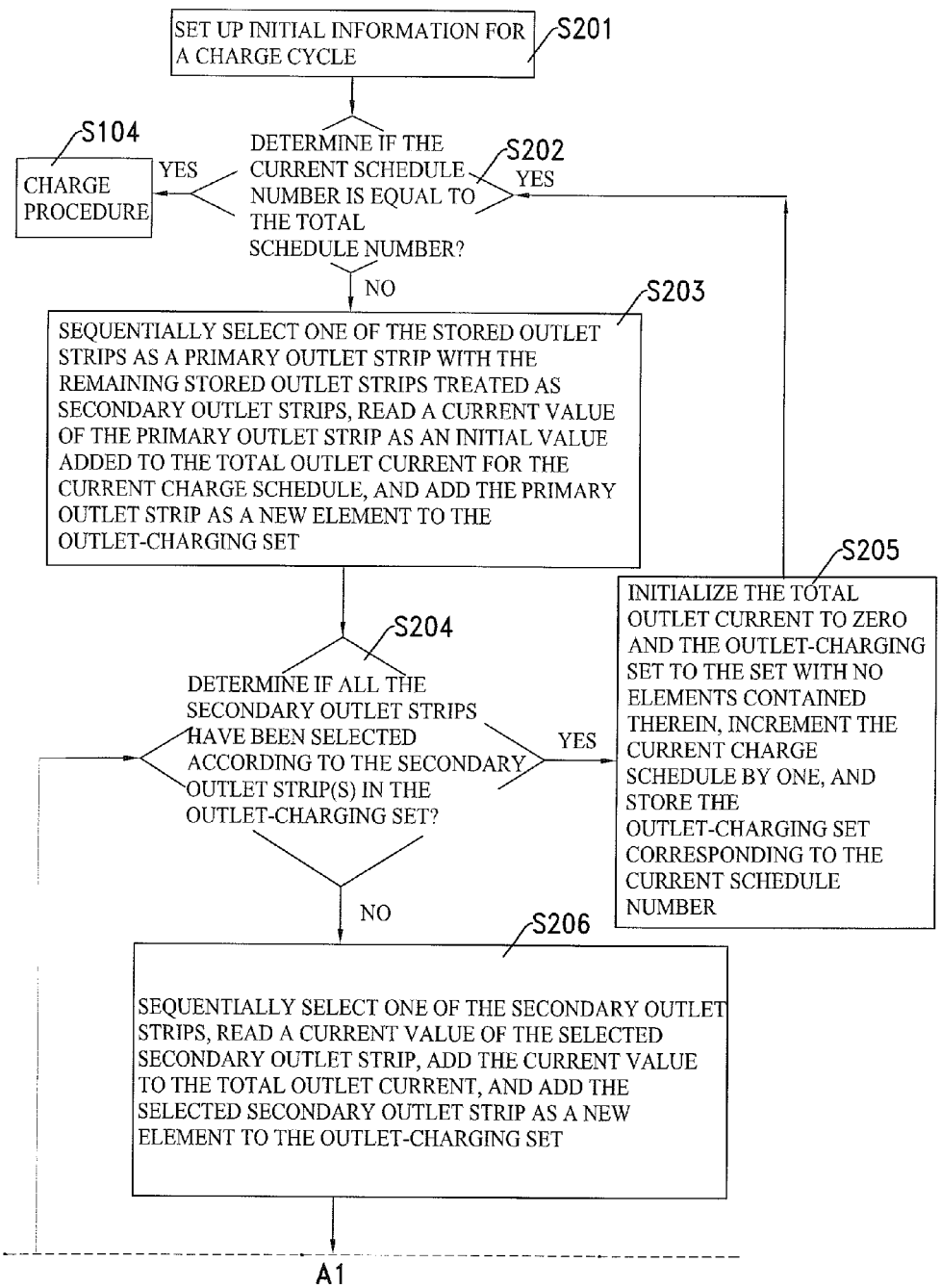
FIGS. 4A and 4B are associated with a flow diagram of a configuration procedure of a charging method for commonly charging multiple digital electronic devices in accordance with the present invention.
Figure 4B:
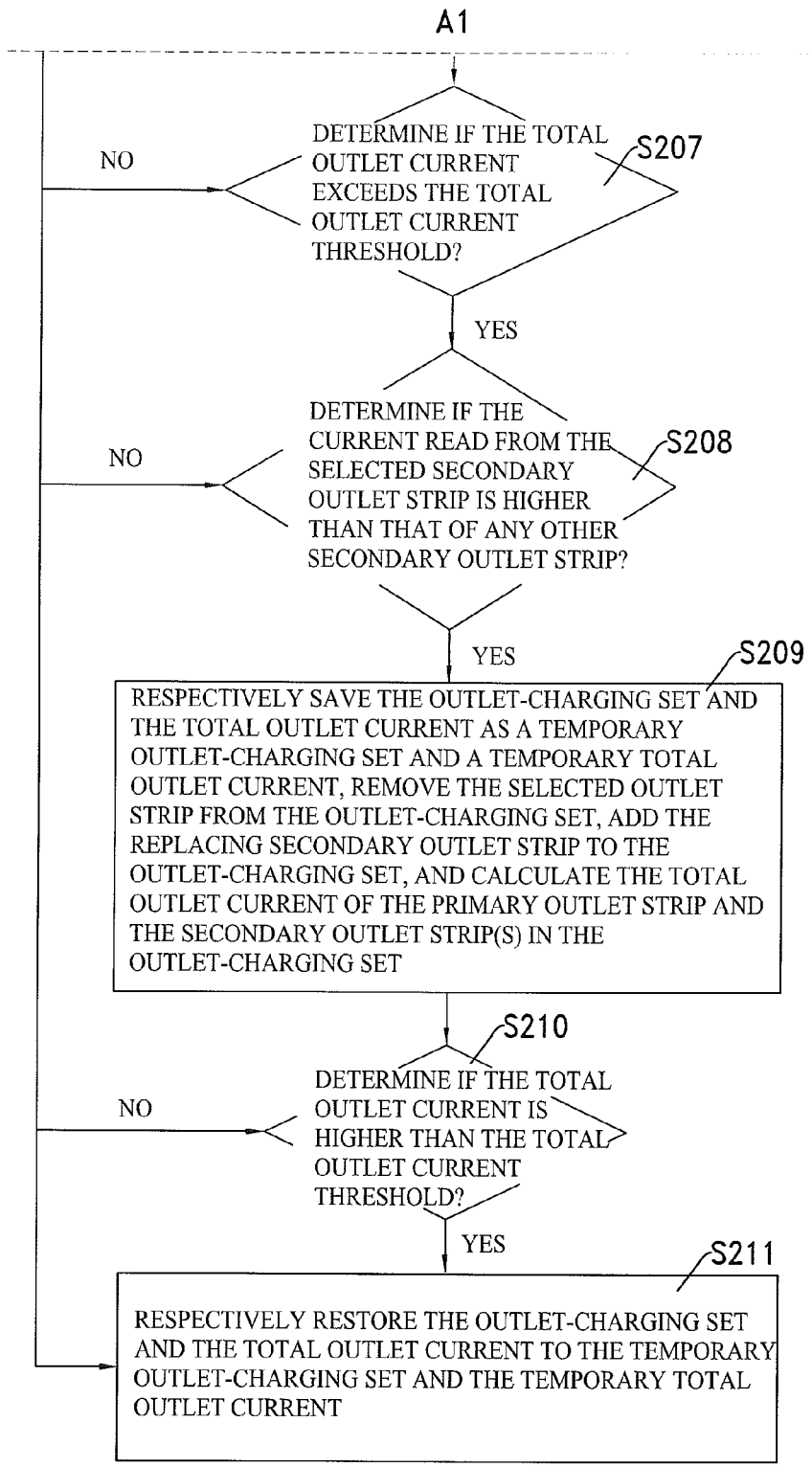

With reference to FIGS. 4A and 4B, the configuration procedure has the following steps.

Step S201: Set up initial information for a charge cycle. A charge cycle includes multiple charge schedules. The number of the charge schedules is equal to the number of the outlet strips. Thus, all the outlet strips can be charged in all the charge schedules of a charge cycle, and each outlet strip is charged once or more within a charge cycle. The initial information provides information required for charging throughout a charge cycle, including a total outlet current threshold, a total schedule number and a current schedule number of the charge schedules, an outlet-charging set and a total outlet current. The total schedule number is initialized to the number of the charge schedules or the outlet strips. The current schedule number represents a current charge schedule to be configured and is initialized to be zero. The outlet-charging set contains the outlet strips selected for the current charge schedule and is a set initialized with no element contained therein. The total outlet current is equal to a sum of all current read from the selected outlet strips in the current charge schedule and is initialized to zero.

Step S202: Determine if the current schedule number is equal to the total schedule number. If positive, indicating that all charge schedules have been done, and perform the charge procedure.

Step S203: Sequentially select one of the stored outlet strips as a primary outlet strip with the remaining stored outlet strips taken as secondary outlet strips, read a current value of the primary outlet strip as an initial value added to the total outlet current for the current charge schedule, and add the primary outlet strip as a new element to the outlet-charging set.

Step S204: Determine if all the secondary outlet strips have been selected according to the secondary outlet strip(s) in the outlet-charging set. If positive, indicating that all the combinations associated with the selected primary outlet strip and the secondary outlet strips in the current charge schedule have been sorted, perform step S205 and resume step S202.

Step S205: Initialize the total outlet current to zero and the outlet-charging set to the set with no elements contained therein, increment the current charge schedule by one, and store the outlet-charging set corresponding to the current schedule number.

Step S206: Sequentially select one of the secondary outlet strips, read a current value of the selected secondary outlet strip, add the current value to the total outlet current, and add the selected secondary outlet strip as a new element to the outlet-charging set. The total outlet current is equal to the current read from the primary outlet strip and the secondary outlet strips in the current charge schedule.

Step S207: Determine if the total outlet current exceeds the total outlet current threshold. If negative, resume step S204.

Step S208: Determine if the current read from the selected secondary outlet strip is higher than that of any other secondary outlet strip. If negative, resume step S204, because none of the secondary outlet strips other than the selected secondary outlet strip has a higher current than that of the selected secondary outlet strip, and the total outlet current will not be reduced by replacing the selected secondary outlet strip with any other secondary outlet strip. If positive, perform step S209.

Step S209: Respectively save the outlet-charging set and the total outlet current as a temporary outlet-charging set and a temporary total outlet current, remove the selected outlet strip from the outlet-charging set, add the replacing secondary outlet strip to the outlet-charging set, and calculate the total outlet current of the primary outlet strip and the secondary outlet strip(s) in the outlet-charging set.

Step S210: Determine if the total outlet current is higher than the total outlet current threshold. If negative, resume step S204. If positive, perform step S211.

Step S211: Respectively restore the outlet-charging set and the total outlet current to the temporary outlet-charging set and the temporary total outlet current and resume step S204.

Figure 5:
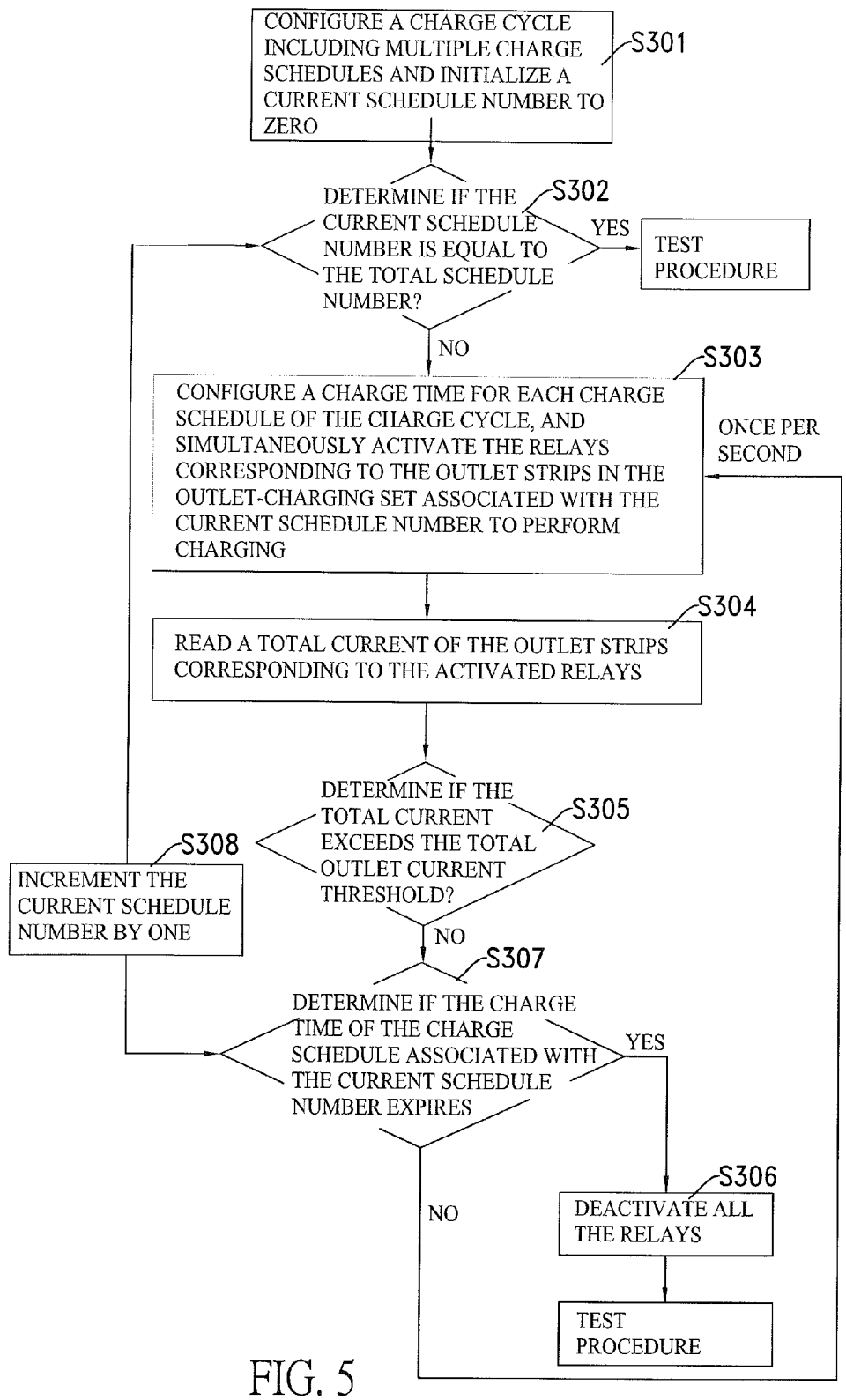
FIG. 5 is a flow diagram of a charge procedure of a charging method for commonly charging multiple digital electronic devices in accordance with the present invention.

With reference to FIG. 5, the charge procedure has the following steps.

Step S301: Configure a charge cycle including multiple charge schedules and initialize a current schedule number to zero.

Step S302: Determine if the current schedule number is equal to the total schedule number. If positive, perform the test procedure to ensure all outlet strips have been charged to have a saturated charge current therein.

Step S303: Configure a charge time for each charge schedule of the charge cycle, and simultaneously activate the relays corresponding to the outlet strips in the outlet-charging set associated with the current schedule number to perform charging. The charge cycle is divided by the total schedule number. In other words, the time of the charge cycle is equally allocated to all the charge schedules associated with the charge cycle.

Step S304: Read a total current of the outlet strips corresponding to the activated relays.

Step S305: Determine if the total current exceeds the total outlet current threshold. If positive, perform step S306 and return to the test procedure to determine if any outlet strip is electrically irregular.

Step S306: Deactivate all the relays.

Step S307: Determine if the charge time of the charge schedule associated with the current schedule number expires. If negative, perform step S304 once per second. If positive, perform step S308 and resume step S302 to continuously perform charging.

Step S308: Increment the current schedule number by one.

To elaborate the method for commonly charging multiple digital electronic devices in accordance with the present invention, the following is an example for description of the test procedure. There are four outlet strips R1~R4. Current values read from the four outlet strips R1~R4 when the test procedure is performed are 4A, 3A, 2A and 1A respectively.

| Outlet strip | R1 | R2 | R3 | R4 |
|---|---|---|---|---|
| Current read from outlet strip | 4 A | 3 A | 2 A | 1 A |

Irregular current value = 8 A,
total outlet current threshold = 8 A,
saturated charge current value = 0.2 A, and
charge cycle = 60 minutes During the test procedure, all current values read from the four outlet strips are lower than the irregular current value and are higher than the saturated charge current value, such that the configuration can be performed on the four outlet strips.

When the configuration procedure is performed, each charge cycle is set to have four charge schedules, namely first, second, third and fourth charge schedules, to respectively correspond to the four outlet strips R1~R4, and each charge schedule is 15 minutes.

As to the first charge schedule, the outlet strip R1 is selected as the primary outlet strip, and the outlet strips R2~R4 are taken as the secondary outlet strips. Firstly, the secondary outlet strip R2 is selected and added to the outlet-charging set associated with the first charge schedule. Then, the outlet-charging set contains the outlet strips R1 and R2, and the total outlet current is equal to 7A, which is lower than the total outlet current threshold 8A. The secondary outlet strip R3 is further added to the outlet-charging set, and the outlet-charging set contains R1, R2 and R3, and the total outlet current is equal to 9A, which is already higher than the total outlet current threshold, and a reconfiguration is therefore needed to prevent occurrence of safety issues, such as over-charging. Hence, another secondary outlet strip with a lower current value than the currently added secondary outlet strip R3 should be substituted for R3. As having a lower current value 1A than R3, the secondary outlet strip R4 is chosen to replace R3 in the outlet-charging set. As the total outlet current of the outlet strips R1, R2 and R4 in the outlet-charging set is equal to 8A, which is not higher than the total outlet current threshold, replacing R3 with R4 is thus confirmed. So far, all the secondary outlet strips have been done with selection for finalizing the combination of the outlet strips (R1+R2+R4) in the outlet-charging set for the first charge schedule.

As to the second charge schedule, the outlet strip R2 is selected as the primary outlet strip, and the outlet strips R1, R3 and R4 are taken as the secondary outlet strips. Firstly, the secondary outlet strip R1 is selected and added to the outlet-charging set associated with the second charge schedule. Then, the outlet-charging set contains the outlet strips R1 and R2, and the total outlet current is equal to 7A, which is lower than the total outlet current threshold 8 A. The secondary outlet strip R3 is further added to the outlet-charging set, and the outlet-charging set contains R1, R2 and R3 and the total outlet current is equal to 9A, which is already higher than the total outlet current threshold, and a reconfiguration is therefore needed for continuous charging. Hence, another secondary outlet strip with lower current value than the currently added secondary outlet strip R3 should be substituted for R3. As having a lower current value 1A than R3, the secondary outlet strip R4 is chosen to replace R3 in the outlet-charging set. As the total outlet current of the outlet strips R1, R2 and R4 in the outlet-charging set is equal to 8A, which is not higher than the total outlet current threshold, replacing R3 with R4 is thus confirmed. So far, all the secondary outlet strips have been done with selection for finalizing the combination of the outlet strips (R1+R2+R4) in the outlet-charging set for the first charge schedule.

As to the third charge schedule, the outlet strip R3 is selected as the primary outlet strip, and the outlet strips R1, R2 and R4 are taken as the secondary outlet strips. Firstly, the secondary outlet strip R1 is selected and added to the outlet-charging set associated with the third charge schedule. Then, the outlet-charging set contains the outlet strips R1 and R3, and the total outlet current is equal to 6A, which is lower than the total outlet current threshold 8A. The secondary outlet strip R2 is further added to the outlet-charging set, and the outlet-charging set contains R1, R2 and R3 and the total outlet current is equal to 9A, which is already higher than the total outlet current threshold, and a reconfiguration is therefore needed for continuous charging. Hence, another secondary outlet strip with a lower current value than the currently added secondary outlet strip R2 should be substituted for R2. As having a lower current value 1A than R2, the secondary outlet strip R4 is chosen to replace R2 in the outlet-charging set. As the total outlet current of the outlet strips R1, R3 and R4 in the outlet-charging set is equal to 7A, which is not higher than the total outlet current threshold, replacing R2 with R4 is thus confirmed. So far, all the secondary outlet strips have been done with selection for finalizing the combination of the outlet strips (R1+R3+R4) in the outlet-charging set for the third charge schedule.

As to the fourth charge schedule, the outlet strip R4 is selected as the primary outlet strip, and the outlet strips R1, R2 and R3 are taken as the secondary outlet strips. Firstly, the secondary outlet strip R1 is selected and added to the outlet-charging set associated with the fourth charge schedule. Then, the outlet-charging set contains the outlet strips R1 and R4, and the total outlet current is equal to 5A, which is lower than the total outlet current threshold 8A. The secondary outlet strip R2 is further added to the outlet-charging set, and the outlet-charging set contains R1, R2 and R4, and the total outlet current is equal to 8A, which is not higher than the total outlet current threshold. As a result, the secondary outlet strip R3 is further added to the outlet-charging set, and the outlet-charging set contains R1, R2, R3 and R4, and the total outlet current is equal to 10A, which is higher than the total outlet current threshold, and a reconfiguration is therefore needed for continuous charging. Hence, another secondary outlet strip with lower current value than the currently added secondary outlet strip R3 should be substituted for R3. As there is no secondary outlet strip left in the outlet-charging set; the out-charging set must be restored to the combination of the outlet strips prior to the addition of the outlet strip R3, which is R1, R2 and R4, to finalize the combination of the outlet strips (R1+R2+R4) in the outlet-charging set for the fourth charge schedule.

The combinations of the outlet strips in the outlet-charging set for the four charge schedules are shown in the following table for the subsequent charge procedure.

| Charge schedule | Combination of outlet strips | Total outlet current |
|---|---|---|
| First | R1 + R2 + R4 | 8 A |
| Second | R1 + R2 + R4 | 8 A |
| Third | R1 + R3 + R4 | 7 A |
| Fourth | R1 + R2 + R4 | 8 A |

The following is another example for description of the configuration procedure. Similarly, there are four outlet strips R1~R4. The only difference resides in the current read from the outlet strip during the test procedure. Current values read from the four outlet strips R1~R4 when the test procedure is performed are 1A, 2A, 3A and 1A respectively.

| Outlet strip | R1 | R2 | R3 | R4 |
|---|---|---|---|---|
| Current read from outlet strip | 1 A | 2 A | 3 A | 1 A |

Irregular current value = 8 A,
total outlet current threshold = 8 A,
saturated charge current value = 0.2 A, and
charge cycle = 60 minutes The combinations of the outlet strips in the outlet-charging set for the four charge schedules can be similarly obtained according to similar steps as described in the foregoing example except different combination of the outlet strips in the outlet-charging set for the four charge schedules.

| Charge schedule | Combination of outlet strips | Total outlet current |
|---|---|---|
| First | R1 + R2 + R3 + R4 | 7 A |
| Second | R1 + R2 + R3 + R4 | 7 A |
| Third | R1 + R2 + R3 + R4 | 7 A |
| Fourth | R1 + R2 + R3 + R4 | 7 A |

From the foregoing examples, the combinations of outlet strips during the first to the fourth charge schedules can be obtained. The charging device and method for commonly charging multiple digital electronic devices in accordance with the present invention can automatically determine if all digital electronic devices connected to multiple outlet strips can be simultaneously charged without requiring additional configuration from users during a charge cycle, such that all digital electronic devices connected to each outlet strip can be charged for at least one charge schedule and such that digital electronic devices connected to multiple outlet strips can be charged in each charge schedule. Accordingly, such automatic determination facilitates optimization of a charging process and enhances charging efficiency and users' operational convenience.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A charging device for commonly charging multiple digital electronic devices, comprising:
    a housing;
    a charge control unit mounted inside the housing and having multiple relays; and
    multiple outlet strips electrically connected to the charge control unit with each outlet strip electrically connected to one of the multiple relays;
    wherein the charge control unit activates all of the multiple relays, records a current value of each outlet strip, configures a total outlet current threshold, and generates multiple charge schedules included in a charge cycle with a combination selected from the multiple outlet strips performing charging in each charge schedule of the charge cycle; wherein the multiple charge schedules are identical to the multiple outlet strips in number; wherein the combination of each charge schedule includes at least one of the multiple outlet strips to perform charging during the charge schedule, wherein a total current value of the at least one of the multiple outlet strips in the charge schedule does not exceed the total outlet current threshold, with all of the multiple outlet strips to perform charging in the multiple charge schedules, wherein the charge control unit sequentially reads each combination selected from the multiple outlet strips in each charge schedule of the charge cycle to activate the relay corresponding to the at least one of the multiple outlet strips in the combination for the at least one of the multiple outlet strips to perform charging during the charge schedule; wherein the charge control unit sets up an irregular current value and selects one of the multiple outlet strips whose current value has not been acquired yet when deactivating all of the multiple relays and recording a current value of each outlet strip, activates the relay corresponding to the selected outlet strip, acquires current from the selected outlet strip, determines if the current value is higher than the irregular current value, deactivates all of the multiple relays if the current is higher than the irregular current value, and selects another outlet strip whose current value has not been acquired yet until the current values of all of the multiple outlet strips are recorded if the current value is not higher than the irregular current value.

2. The charging device as claimed in claim 1, wherein the charge control unit further configures a saturated charge current value being less than the irregular current value, selects one of the multiple outlet strips whose current value has not been acquired yet, activates the relay corresponding the selected outlet strip and reads the current value of the selected outlet strip, determines if the current value of the selected outlet strip is located between the irregular current value and the saturated charge current value, and further selects another outlet strip whose current value has not been acquired yet until all the current values of the multiple outlet strips are acquired.

3. The charging device as claimed in claim 1, wherein when activating all of the multiple relays and recording a current value of each outlet strip, the charge control unit simultaneously activates the relays corresponding to the multiple outlet strips and sequentially reads and records the current value of each outlet strip.

4. The charging device as claimed in claim 1, wherein:
    the charge control unit generates the combination selected from the multiple outlet strips in each charge schedule by:
    setting up initial information for the charge cycle, wherein the initial information has a total outlet current initialized to zero;
    sequentially selecting one of the multiple outlet strips as a primary outlet strip with remaining outlet strips taken as secondary outlet strips in the charge schedule sequentially selected from the charge cycle, and reading a current value of the primary outlet strip added to the total outlet current;
    sequentially selecting at least one of the secondary outlet strips and reading a current value of each of the at least one secondary outlet strip added to the total outlet current;
    arranging the primary outlet strip and the at least one selected outlet strip with the total outlet current not exceeding the total outlet current threshold as a combination of the outlet strips in the selected charge schedule; and
    returning to sequentially selecting one of the multiple outlet strips as a primary outlet strip until all of the multiple outlet strips have been selected as the primary outlet strip to generate combinations of the multiple outlet strips in the respective charge schedules.

5. The charging device as claimed in claim 4, wherein:
    the initial information for the charge cycle includes a total outlet current threshold, an outlet-charging set and a total outlet current, wherein the outlet-charging set is a set initialized with no element contained therein and the total outlet current is initialized to zero;

sequentially selecting the at least one of the secondary outlet strip further includes:
determining if all the secondary outlet strips have been selected according to the secondary outlet strips in the outlet-charging set;
sequentially selecting one of the secondary outlet strips, reading a current value of the selected secondary outlet strip, adding the current value to the total outlet current, and adding the selected secondary outlet strip as a new element to the outlet-charging set when all the secondary outlet strips have not been selected;
determining if the total outlet current exceeds the total outlet current threshold, and resuming determining if all the secondary outlet strips have been selected when the total outlet current exceeds the total outlet current threshold;
determining if the current read from the selected secondary outlet strip is higher than that of any other secondary outlet strip when the total outlet current does not exceed the total outlet current threshold;
respectively saving the outlet-charging set and the total outlet current as a temporary outlet-charging set and a temporary total outlet current, removing the selected outlet strip from the outlet-charging set, adding the replacing secondary outlet strip to the outlet-charging set, and calculating the total outlet current of the primary outlet strip and the secondary outlet strips in the outlet-charging set;
determining if the total outlet current is higher than the total outlet current threshold, and resuming determining if all the secondary outlet strips have been selected when the total outlet current is not higher than the total outlet current threshold; and
respectively restoring the outlet-charging set and the total outlet current to the temporary outlet-charging set and the temporary total outlet current and resuming determining if all the secondary outlet strips have been selected when the total outlet current is higher than the total outlet current threshold.

6. The charging device as claimed in claim 5, wherein the charge procedure includes:
determining if the total current read from the relays activated to correspond to the outlet strips for the charge schedule sequentially selected in the charge cycle exceeds the total outlet current threshold, deactivating the relays corresponding to the outlet strips for the selected charge schedule and returning to the test procedure when the total current exceeds the total outlet current threshold, and continuously activating the relays corresponding to the outlet strips for the selected charge schedule when the total current does not exceed the total outlet current threshold; and
determining if all the multiple charge schedules have been selected for charging, deactivating the relays corresponding to the outlet strips for the selected charge schedule and returning to the test procedure and returning to the test procedure when all the multiple charge schedules have been selected, and sequentially reading another one of the multiple charge schedules in the charge cycle and activating the relays corresponding to the outlet strips for the selected charge schedule when all the multiple charge schedules have not been selected.

7. The charging device as claimed in claim 6, wherein determining if the total current read from the relays activated to correspond to the outlet strips for the charge schedule further includes determining if a charge time of the selected charge schedule expires, performing determining if all the multiple charge schedules have been selected for charging when the charge time of the selected charge schedule expires, and performing determining if the total current read from the relays activated to correspond to the outlet strips for the charge schedule sequentially selected in the charge cycle exceeds the total outlet current threshold once per second when the charge time of the selected charge schedule does not expire.

8. The charging device as claimed in claim 7, wherein a time of each sequentially selected charge schedule in determining if the total current read from the relays activated to correspond to the outlet strips for the charge schedule is equal to a result of dividing a time of the charge cycle by the number of the multiple charge schedules, and the time of the charge cycle is equally allocated to all the charge schedules associated with the charge cycle.

9. The charging device as claimed in claim 4, wherein the multiple outlet strips are mounted inside the housing; and wherein the housing has:
two shelves mounted inside the housing in a top-down direction;
a display interface mounted on a side surface of the housing and electrically connected to the charge control unit;
a power supply mounted inside the housing and electrically connected to the charge control unit; and
multiple trolleys mounted on four corners of a bottom of the housing.

10. The charging device as claimed in claim 4, wherein the multiple outlet strips are mounted on a side surface of the housing; and wherein the housing has:
a display interface mounted on another side surface of the housing and electrically connected to the charge control unit; and
a power supply mounted inside the housing and electrically connected to the charge control unit.

11. A method as for commonly charging multiple digital electronic devices performed by a charging device, wherein the charging device has a charge control unit and multiple outlet strips, wherein each outlet strip is electrically connected to the charge control unit through a relay, and wherein the charge control unit activates or deactivates the relays to connect or disconnect power to the multiple outlet strips; wherein the method comprises:
a test procedure activating all of the relays to acquire and record a current value of each outlet strip;
a configuration procedure setting up a total outlet current threshold, and generating multiple charge schedules included in a charge cycle with a combination selected from the multiple outlet strips performing charging in each charge schedule of the charge cycle according to the current values recorded in the test procedure, wherein the multiple charge schedules are identical to the multiple outlet strips in number, wherein each combination selected from the multiple outlet strips includes at least one of the multiple outlet strips for each charge schedule in the charge cycle, wherein a total current value of the at least one of the multiple outlet strips in each combination does not exceed the total outlet current threshold, and combinations selected from the multiple outlet strips in the charge cycle include all of the multiple outlet strips; and
a charge procedure sequentially activating the relays corresponding to the at least one of the multiple outlet strips for each charge schedule in the charge cycle to perform charging; wherein the test procedure includes:

setting up an irregular current value;
sequentially selecting one of the multiple outlet strips whose current value has not been acquired yet, activating one of the relays corresponding to the selected outlet strip, and acquiring a current value from the selected outlet strip;
determining if the current value is higher than the irregular current value, deactivating the relay corresponding to the selected outlet strip to terminate the test procedure when the current value is higher than the irregular current value; and
when the current value is not higher than the irregular current value, determining if the relays corresponding to all the outlet strips have been activated and the current values of the outlet strips have been acquired and recorded, performing the configuration procedure when all the relays have been activated and the current values of all of the multiple outlet strips have been acquired and recorded, and performing sequentially selecting one of the multiple outlet strips whose current value has not been acquired yet when all the relays have not been activated and the current values of all of the multiple outlet strips have not been acquired and recorded.

12. The method as claimed in claim 11, wherein:
setting up the irregular current value includes setting up a saturated charge current value;
determining if the current value is higher than the irregular current value further includes determining if the current value is lower than the saturated charge current value, and recording the current value and performing determining if the relays corresponding to all of the multiple outlet strips have been activated when the current value is lower than the saturated charge current value; and
determining if the relays corresponding to all the outlet strips have been activated further includes deactivating all of the relays when the current values of all of the multiple outlet strips have been acquired and are lower than the saturated charge current value to stop charging, and performing the configuration procedure when the current values of all the outlet strips have been acquired and the current value of any one of the multiple outlet strips is not lower than the saturated charge current value.

13. The method as claimed in claim 11, wherein the test procedure simultaneously activates the relays corresponding to the multiple outlet strips and reads and records the current value of each outlet strip.

14. A method for commonly charging multiple digital electronic devices performed by a charging device, wherein the charging device has a charge control unit and multiple outlet strips, wherein each outlet strip is electrically connected to the charge control unit through a relay, and wherein the charge control unit activates or deactivates the relays to connect or disconnect power to the multiple outlet strips; wherein the method comprises:
a test procedure activating all of the relays to acquire and record a current value of each outlet strip;
a configuration procedure setting up a total outlet current threshold, and generating multiple charge schedules included in a charge cycle with a combination selected from the multiple outlet strips performing charging in each charge schedule of the charge cycle according to the current values recorded in the test procedure, wherein the multiple charge schedules are identical to the multiple outlet strips in number; wherein the multiple charge schedules are identical to the multiple outlet strips in number, wherein each combination selected from the multiple outlet strips includes at least one of the multiple outlet strips for each charge schedule in the charge cycle, wherein a total current value of the at least one of the multiple outlet strips in each combination does not exceed the total outlet current threshold, and combinations selected from the multiple outlet strips in the charge cycle include all of the multiple outlet strips; and
a charge procedure sequentially activating the relays corresponding to the at least one of the multiple outlet strips for each charge schedule in the charge cycle to perform charging; wherein:
the configuration procedure includes generating the combination selected from the multiple outlet strips in each charge schedule of the charge cycles;
setting up initial information for the charge cycle, wherein the initial information has a total outlet current initialized to zero;
sequentially selecting one of the multiple outlet strips as a primary outlet strip with remaining outlet strips taken as secondary outlet strips in a charge schedule sequentially selected from the charge cycle, and reading a current value of the primary outlet strip added to the total outlet current;
sequentially selecting at least one of the secondary outlet strips and reading a current value of each of the at least one secondary outlet strip added to the total outlet current;
arranging the primary outlet strip and the at least one selected outlet strip with the total outlet current not exceeding the total outlet current threshold as a combination of the outlet strips in the selected charge schedule; and
returning to sequentially selecting the one of the multiple outlet strips as a primary outlet strip until all of the multiple outlet strips have been selected as the primary outlet strip.

15. The charging device as claimed in claim 14, wherein:
the initial information for the charge cycle includes a total outlet current threshold, an outlet-charging set and a total outlet current, wherein the outlet-charging set is a set initialized with no element contained therein and the total outlet current is initialized to zero;
sequentially selecting at least one of the secondary outlet strips further includes:
determining if all of the secondary outlet strips have been selected according to the secondary outlet strips in the outlet-charging set;
sequentially selecting one of the secondary outlet strips, reading a current value of the selected secondary outlet strip, adding the current value to the total outlet current, and adding the selected secondary outlet strip as a new element to the outlet-charging set when all the secondary outlet strips have not been selected;
determining if the total outlet current exceeds the total outlet current threshold, and resuming determining if all the secondary outlet strips have been selected when the total outlet current exceeds the total outlet current threshold;
determining if the current read from the selected secondary outlet strip is higher than that of any other secondary outlet strip when the total outlet current does not exceed the total outlet current threshold;
respectively saving the outlet-charging set and the total outlet current as a temporary outlet-charging set and a temporary total outlet current, removing the selected outlet strip from the outlet-charging set, replacing the secondary outlet strip in the outlet-charging set with a remaining secondary outlet strip, and calculating the total outlet current of the primary outlet strip and the secondary outlet strips in the outlet-charging set;

determining if the total outlet current is higher than the total outlet current threshold, and resuming determining if all the secondary outlet strips have been selected when the total outlet current is not higher than the total outlet current threshold; and respectively restoring the outlet-charging set and the total outlet current to the temporary outlet-charging set and the temporary total outlet current and resuming determining if all the secondary outlet strips have been selected when the total outlet current is higher than the total outlet current threshold.

16. The charging device as claimed in claim 15, wherein the charge procedure includes:

determining if the total current read from the relays activated to correspond to the outlet strips for the charge schedule sequentially selected in the charge cycle exceeds the total outlet current threshold, deactivating the relays corresponding to the outlet strips for the selected charge schedule and returning to the test procedure when the total current exceeds the total outlet current threshold, and continuously activating the relays corresponding to the outlet strips for the selected charge schedule when the total current does not exceed the total outlet current threshold; and determining if all the multiple charge schedules have been selected for charging, deactivating the relays corresponding to the outlet strips for the selected charge schedule and returning to the test procedure and returning to the test procedure when all the multiple charge schedules have been selected, and sequentially reading another one of the multiple charge schedules in the charge cycle and activating the relays corresponding to the outlet strips for the selected charge schedule when all the multiple charge schedules have not been selected.

17. The charging device as claimed in claim 16, wherein determining if the total current read from the relays activated to correspond to the outlet strips for the charge schedule further includes determining if a charge time of the selected charge schedule expires, performing determining if all the multiple charge schedules have been selected for charging when the charge time of the selected charge schedule expires, and determining if the total current read from the relays activated to correspond to the outlet strips for the charge schedule sequentially selected in the charge cycle exceeds the total outlet current threshold once per second when the charge time of the selected charge schedule does not expire.

18. The charging device as claimed in claim 17, wherein a time of each sequentially selected charge schedule in determining if the total current read from the relays activated to correspond to the outlet strips for the charge schedule is equal to a result of dividing a time of the charge cycle by the number of the multiple charge schedules, and wherein the time of the charge cycle is equally allocated to all the charge schedules associated with the charge cycle.

* * * * *